3,707,579
OLEFIN DISPROPORTIONATION PROCESS
Dean P. Montgomery, Bartlesville, Okla., assignor to
Phillips Petroleum Company
No Drawing. Filed Dec. 28, 1970, Ser. No. 102,107
Int. Cl. C07c 3/62
U.S. Cl. 260—683 D        5 Claims

ABSTRACT OF THE DISCLOSURE

The process of disproportionating olefin hydrocarbons is improved by contacting the feed olefin hydrocarbons with a bed of activated and CO treated magnesium oxide at a temperature below which any significant isomerization activity is encountered prior to contacting the feed with the olefin disproportionation catalyst.

BACKGROUND OF THE INVENTION

Field of the invention

This invention relates to olefin disproportionation.

Description of the prior art

The reaction of olefinic materials to produce other olefinic materials wherein the reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, and wherein the two new double bonds can be on the same or different molecules, has been called "the olefin reaction." The breaking and formation of these bonds can be visualized by using a mechanistic scheme involving a cyclobutane intermediate. Thus, two unsaturated pairs of carbon atoms combine to form a 4-center (cyclobutane) intermediate which then disassociates by breaking either set of opposing bonds. This reaction can be illustrated by the following formulas:

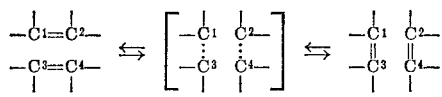

Other terms have been utilized to describe the reactions of olefinic materials which are within the scope of the olefinic reaction as defined above. These include such terms as "olefin disproportionation," "olefin dismutation," "transalkylidenation," and "olefin metathesis." Throughout the specification and claims the term "olefin disproportionation" is used as a matter of choice and is deemed to be equivalent to the above-mentioned terms, including "the olefin reaction" terminology. Numerous catalyst systems have been reported which effect this reaction, including the catalysts of U.S. 3,261,879, Banks (1966), and U.S. 3,365,513, Heckelsberg (1968).

It is known that a suitable double bond isomerization catalyst and an olefin disproportionation catalyst can be combined within a single catalytic zone, or alternatively, employed in a consecutive bed arrangement to disproportionate olefins. A particularly suitable catalyst of this type is a mixture of magnesium oxide and tungsten oxide on silica. With this combination, the double bond isomerization component of the mixture functions as a double bond isomerization catalyst and rearranges the position of the double bonds in the feed hydrocarbon. Thus butene-2 can be contacted with the combination catalyst to provide propylene and pentene-2. In this reaction, the double bond isomerization catalyst isomerizes a portion of the butene-2 to butene-1, the latter compound undergoing reaction with butene-2 to form the propylene and pentene-2 products.

It is also known that the above-mentioned combination catalysts can be improved by contact of the catalyst mixture, or the olefin disproportionation component and the double bond isomerization component separately with carbon monoxide, after activation.

Each of the prior art uses of a magnesium oxide mentioned above has employed this material because of its ability to rearrange the unsaturation positions in olefinic molecules. However, it is well known that in order for significant double bond isomerization to occur with most olefins, the olefin is contacted with the magnesium oxide catalyst at temperatures in excess of about 150° F.

One problem often encountered in olefin disproportionation processes is the contamination of the catalyst by trace amounts of impurities associated with the hydrocarbon feed. These trace impurities include such materials as water, dienes, and may include polar hydrocarbon compounds, carbonyl compounds and the like. It has previously been recognized that percolation of the feed material through a bed of activated MgO at a temperature of less than that at which significant isomerization occurs removes those impurities which deleteriously affect the activity of the olefin disproportionation catalyst.

OBJECTS OF THE INVENTION

It is an object of the invention to increase the conversion of the olefin feed hydrocarbon when undergoing the olefin disproportionation reactions. Other objects and advantages of the invention will be apparent from reading the following summary of the invention, detailed description of the invention and claims.

SUMMARY OF THE INVENTION

I have discovered that the effectiveness of the treatment of the olefin feed material by percolation through a bed of activated magnesium oxide at a temperature below which isomerization occurs can be increased by pretreating the bed with carbon monoxide. Accordingly, the process of the invention comprises passing the olefin feed over a bed of activated magnesium oxide at a temperature of less than 150° F., preferably at a temperature of from about 0° to 100° F., prior to contacting the olefin with the olefin disproportionation catalyst. Significant increases in the conversion of the feed olefin and/or increase in catalyst life are provided by this treatment.

DETAILED DESCRIPTION OF THE INVENTION

The invention is applicable to any process wherein olefins are converted according to the above-mentioned olefin disproportionation reaction. The catalysts and processes which effect the olefin disproportionation reaction are known in the art. The olefin hydrocarbons which are capable of the olefin disproportionation reaction are also well known. The invention finds particular usefulness in processes wherein mixtures of olefins are treated to provide a variety of olefin reaction products, such as the treatment of olefin containing streams from refinery operations.

The magnesium oxide, sometimes referred to as magnesia, applicable for use in the invention, can be any catalytic grade or activated magnesium oxide prepared by any suitable technique. Thus, it can be prepared synthetically or derived from naturally occurring mineral sources, such as Brucite. The form of magnesia can range from fine powder to coarse granules. The finished magnesium oxide, after activation and treatment with the treating gas, can also be in the form of powder or granules, as well as other forms such as agglomerates, pellets, spheres, extrudates, beads, and the like, depending on the type of contacting technique used to treat the olefin feed. The magnesia should have a surface area of at least about 1 square meter per gram.

The magnesium oxide is prepared for use, or regenerated after prolonged treatment of the olefin, using the following procedure. The magnesia is subjected to calcination in a flowing stream of an oxygen containing gas at elevated temperatures, e.g., by heating for about 1 to about 30 hours at a temperature of about 500° to about 1500° F., preferably 900°–1200° F. The oxygen containing gas is preferably air, although the air can be used in admixture with an inert gas such as nitrogen. When using a mixture, the oxygen content is adjusted so that the activation or regeneration front remains within the desired temperature range. When the front has traveled through the bed, the flow of the oxygen containing gas is stopped.

The bed is then purged with an inert gas, e.g., nitrogen at the temperature within the above-specified oxygen gas treatment ranges, preferably at about the same temperature usd for the oxygen gas treatment. The amount of inert gas used to purge the bed is about 5 to about 40 volumes of gas per volume of MgO.

The purged bed is then contacted with a carbon monoxide containing gas, e.g., at elevated temperatures within those employed for the above-mentioned oxygen containing gas treatment. Once again, the temperature is preferably at about the same temperature as the oxygen treatment and nitrogen purge temperature, and still more preferably above at least about 850° F. The CO stream used should contain no catalyst poisons and preferably contains at least about 30 mol percent CO, the remainder being inerts such as nitrogen, methane, and the like. The amount of CO used will be essentially the same as the inert gas purge, that is, about 5 to about 40 volumes of gas per volume of magnesium oxide.

The activation and/or regeneration operation is completed by once again purging the bed of magnesia with an inert gas, e.g., nitrogen at the selected high temperature. Subsequently, the bed is brought to the treatment temperature of about 145° F. or less by continuing the inert gas treatment with cool gas, by admission of feedstock, to effect cooling or the bed can be shut in under inert gas presure and allowed to cool gradually.

The olefin feed which is treated in accordance with the invention is passed through the activated magnesium oxide at a temperature of 145° F. or less, preferably in the range of from about 0 to about 100° F. Weight hourly space velocities of the feed olefin can be in the range of from about 0.01 to about 10, preferably about 0.1 to about 1. Fresh feed olefin streams and recycle streams can be treated.

Any catalyst having activity for converting olefins in accordance with the above-described olefin disproportionation reaction can be employed for the olefin disproportionation steps of the invention. These catalysts include both heterogeneous catalysts, which are capable of olefin disproportionation activity in the presence or absence of a liquid hydrocarbon solvent, and homogeneous catalysts which require the presence of a hydrocarbon diluent during the reaction. Of course, where the feed olefin is liquid under normal reaction conditions, it can function as a diluent for the homogeneous catalyst. For the olefin disproportionation step of this invention and because of the generally greater activity, the heterogeneous catalysts are preferred.

The heterogeneous catalysts which are particularly suitable for the process of the invention include tungsten oxide on silica, tungsten oxide on alumina, molybdenum oxide on alumina, rhenium oxide on alumina, rhenium oxide on aluminum phosphate, molybdenum oxide on aluminum phosphate, and molybdenum hexacarbonyl on alumina. These catalysts are the subject of U.S. Pats. 3,261,879 (Banks) of July 19, 1966; U.S. 3,365,513 (Heckelsberg) of Jan. 23, 1968; British Pat. 1,054,864 (British Petroleum) of Jan. 11, 1967; U.S. 3,463,827 (Banks) of Aug. 26, 1969; and U.S. application Ser. No. 846,977, filed Aug. 1, 1969, now abandoned.

The preparation, activation and maintenance of the heterogeneous olefin disproportionation catalysts are known in the art, and with reference to the specific systems as discussed above, are disclosed in the above-mentioned patents and applications. The various solid catalysts exhibit different optimum reaction temperatures, pressures, and contact times for the olefin disproportionation reaction. Accordingly, the specific reaction temperature, pressure, and contact time for the disproportionation reaction employed in the process of the invention is easily within the skill of one in the art.

Any of the above-mentioned heterogeneous catalysts sometimes employs a suitable double bond isomerization catalyst such as magnesium oxide in combination with the olefin disproportionation catalyst. The magnesium oxide can be suitably commingled with the solid olefin disproportionation catalyst and employed in a single olefin disproportionation reactor. Other suitable combination catalysts are disclosed in copending applications Ser. No. 627,635, Banks, filed Apr. 3, 1967, now abandoned, and Ser. No. 678,499, filed Oct. 27, 1967, now abandoned.

The invention can be illustrated by the following examples. The information provided in the examples is for the purpose of illustration only, and it should not be construed to limit the invention as defined hereinabove.

EXAMPLE I

A series of runs was made wherein an olefin stream comprising diisobutylene and ethylene were converted to neohexene. The diisobutylene feed was an isomeric mixture comprising 65.5 weight percent 2,4,4-trimethylpentene-1, and 29.4 weight percent 2,4,4-trimethylpentene-2. The olefin disproportionation of the 2-isomer with ethylene yields neohexene (2,2-dimethylbutene-1) and isobutylene. No new products are obtained by the reaction of ethylene with the 1-isomer.

The olefin disproportionation catalyst system was a 2/1 weight ratio mixture of magnesium oxide catalyst and tungsten oxide on silica catalyst. The catalyst system was activated in a single pass reactor by passing air through the bed for approximately three hours at 1000° F. The catalyst system was then further activated by passing carbon monoxide over it for 15 minutes at 1000° F., purged with $N_2$, and then cooled to 700° F. in a nitrogen atmosphere.

The activated bed of MgO utilized to purify the olefin feed was a commercial catalyst of $3/16''$ diameter x $3/16''$, length pellets. These were ground to 20 to 40 mesh, and then activated in the presence of air for 6 hours at 1000° F.' The catalyst was treated with 30 volumes of CO per volume of catalyst at a temperature of 1000° F., purged with nitrogen and cooled to below about 150° F. The diisobutylene feed was passed through the purifying bed of MgO at a temperature of 85° F.

Reaction conditions and results are summarized in the table below:

TABLE I

| Run No. | 1 [a] | 2 | 3 [b] | | 4 [b] | | |
|---|---|---|---|---|---|---|---|
| Reactor temp., °F | 700 | 700 | 700 | 700 | 600 | 600 | 650 |
| P.s.i.g. | 400 | 400 | 400 | 400 | 400 | 400 | 400 |
| WHSV [c] | 25 | 25 | 25 | 25 | 25 | 25 | 25 |
| $C_2H_4$/DIB (molar) | 4/1 | 4/1 | 4/1 | 4/1 | 4/1 | 4/1 | 4/1 |
| Sample time, hr | 2½–3 | 2½–3 | 1½–2 | 3–3½ | 4–4½ | 2½–3 | 1–1½ |
| Percent conversion | 69.4 | 75.8 | 72.8 | 67.9 | 46.3 | 59.2 | 68.2 |
| Percent selec. to neohexene [d] | 66.7 | 79.3 | 67.4 | 70.3 | 99.1 | 87.0 | 76.0 |
| Product comp., wt. percent: | | | | | | | |
| Propylene | 3.95 | 3.65 | 4.74 | 3.30 | 1.40 | 1.39 | 1.47 |
| Isobutene | 50.48 | 46.90 | 51.03 | 50.49 | 42.11 | 46.50 | 49.16 |
| Neohexene | 37.77 | 42.84 | 35.75 | 38.59 | 52.09 | 45.95 | 41.70 |
| 2,3-dimethyl-butene-1 | 2.20 | 1.70 | 2.35 | 2.36 | 1.01 | 1.64 | 2.25 |
| 2,3-dimethyl-butene-2 | 5.00 | 4.50 | 5.54 | 4.91 | 2.79 | 4.22 | 5.11 |
| $C_7^-+$ | 0.60 | 0.41 | 0.59 | 0.40 | 0.57 | 0.30 | 0.26 |

[a] Control run 1, the feed was not passed through the CO activated MgO bed; in runs 2, 3, and 4, the feeds were passed through the CO activated MgO guard bed.
[b] The catalyst mixture used in run 2 was reactivated at 1,000° F. in air.
[c] Based on tungstate catalyst only.
[d] $\frac{\text{Grms. of neohexene in product} \times 100}{\text{Grms. of DIB converted} \times 84/112}$ = percent selectivity.

Comparison of runs 1 and 2 in the above table shows that the treatment of the feed with CO treated activated MgO at a temperature of 85° F. increases the conversion and relative selectivity to the desired neohexene product. Moreover, runs 3 and 4 demonstrated that the treatment of the invention exerts a beneficial effect on the disproportionation process when using a regenerated catalyst, particularly in increased relative selectivity.

EXAMPLE II

In a manner similar to Example I a diisobutylene feed stream was converted to neohexene by reaction with ethylene. The diisobutylene feed was an isomeric mixture comprising approximately 78.0 volume percent 2,4,4-trimethylpentene-1, 16.0 volume percent 2,4,4-trimethylpentene-2, and 8.0 volume percent of other $C_8$ hydrocarbons.

The olefin disproportionation catalyst system was a tungsten oxide on silica composition containing about 6.0 weight percent tungstem oxide. The catalyst was activated in flowing air at a temperature of 1000° F. for about 4 hours. The catalyst was then treated with 30 volumes of carbon monoxide per volume of catalyst at 1000° F.

A series of four runs was made in which, in the two runs 1 and 3. the activated magnesium oxide purification step was accomplished without CO pretreatment of the bed. In the two invention runs, 2 and 4, the activated magnesium oxide bed was treated with CO prior to contact with the feed. In the runs wherein CO was not used the magnesium oxide was the same as used in Example I and was prepared as in Example I, except that the CO treatment was omitted. In the two runs wherein CO treatment was employed, the catalyst was the same as used in Example I and was prepared in the same manner. The feed was passed through the preliminary MgO bed at 85° F. in all runs prior to contacting the disproportionation catalyst.

The conditions of treatment and results are summarized in Table II:

TABLE II

| Run No. | 1 | 2 | 3 | 4 |
|---|---|---|---|---|
| CO pretreatment of MgO bed | No | Yes | No | Yes |
| Reaction temp., °F | 700 | 700 | 700 | 700 |
| P.s.i.g. | 400 | 200 | 200 | 200 |
| WHSV [a] | 50 | 75 | 50 | 75 |
| $C_2H_4$/DIB (molar) | 4/1 | 4/1 | 4/1 | 4/1 |
| Relative conversion [c] | 0.96 | 1 | 0.58 | 1 |
| Relative selec. to neohexene [d] | 0.69 | 1 | 0.76 | 1 |
| Product comp., wt. percent: [b] | | | | |
| Isobutene | 15.0 | 16.0 | 11.0 | 15.5 |
| Neohexene | 20.0 | 31.0 | 16.5 | 30.4 |
| Diisobutylene | 28.0 | 40.0 | 57.0 | 43.5 |

[a] Based on tungstate catalyst only.
[b] The total reactor effluent was separated by flashing and batch distillation, into a vapor cut lighter than isobutenes, an isobutene cut, a neohexene cut, a diisobutylene cut and a residue. Analyses for butenes, neohexene, and diisobutylenes were not made on the residue nor on the lighter cut.
[c] Relative conversion is obtained by assuming that at least all of the diisobutylene converted is represented by produced neohexene. Therefore, the conversion and selective values are the ratio of neohexene to diisobutylene in the product.
For example: For Runs 1 and 2 conversion and selectivity are calculated as follows:
(1) 20 parts by weight of neohexene is produced. To produce 20 parts of neohexene (a 6 carbon molecule) one needs 26.7 parts by weight of diisobutylene (an 8 carbon molecule) because $\frac{112}{84} \times 20 = 26.7$.
(2) Since 28.0 parts by weight of diisobutylene remain then 26.7 + 28.0=54.7. 54.7 DIB in the feed. Thus, conversion is at least $\frac{26.7}{54.7} \times 100 = 49.0\%$.
(3) Using the same calculation for Run 2, conversion is 50.8%.
(4) Relative conversion is obtained by assigning the unit 1 to the lowest conversion. Thus, relative conversion for Run 1 as compared with invention Run 2 is $\frac{0.49}{0.508} = .96$.

[d] Relative selectivity is calculated on the basis of the ratio of the converted products, i.e., the ratio of isobutene/neohexene. Thus for Run 1 $\frac{20}{15} = 1.33$. For Run 2, $\frac{31}{16} = 1.94$. Once again, assigning the unit 1 to the highest figure for selectivity, the relative selectivity $= \frac{1 \times 1.33}{1.94} = 0.69$.

The same calculations are made for Runs 3 and 4.

The above data demonstrates that pretreatment of the diisobutylene feed with the CO pretreated magnesium oxide at 85° F. provides a significant improvement over treating the feed with magnesium oxide at 85° F. which has not been subjected to the CO treatment. It should also be noted in Runs 2 and 4 that the space velocities were higher than in Runs 1 and 3, and in Runs 2, 3 and 4 the pressures were lower than Run 1. The lower pressures and higher space rates would be expected to decrease conversion, and decreased conversion is usually accompanied by increased selectivity. However, using the process of the invention, there is still provided a significant improvement in both conversion and selectivity.

Reasonable variations and modifications of the process of my invention are possible without departing from the spirit and scope thereof.

I claim:
1. In a process of disproportionating olefin hydrocarbons using an olefin disproportionation catalyst, a combination of an olefin disproportionation catalyst and a double bond isomerization catalyst, or mixtures thereof, the improvement comprising contacting the olefin hydrocarbon feed, prior to contacting the olefin with the disproportionation catalyst, at a temperature below about 145° F. with a bed of MgO which has been activated at a high temperature, subjected to treatment with carbon monoxide, and cooled to the contacting temperature.

2. The process of claim 1 wherein the bed of MgO is activated by heating in a flowing stream of an oxygen-containing gas for about 1 to about 30 hours at a temperature of about 500–1500° F.

3. The process of claim 2 wherein the bed of MgO subsequent to treatment with said oxygen-containing gas is contacted with a flowing stream comprising carbon monoxide at a temperature of from about 800–1400° F. for a period of time of from about 1 minute to 30 hours.

4. The process of claim 3 wherein the olefin hydrocarbons are contacted with the CO treated bed of MgO at a temperature in the range of from 0 to 100° F.

5. The process of claim 4 wherein the olefin hydrocarbons comprise diisobutylene.

References Cited
UNITED STATES PATENTS
3,565,969  2/1971  Hutto et al. ......... 260—683

DELBERT E. GANTZ, Primary Examiner
C. E. SPRESSER, Jr., Assistant Examiner